United States Patent
Klein et al.

(10) Patent No.: US 9,659,354 B2
(45) Date of Patent: May 23, 2017

(54) COLOR MATCHING FOR IMAGING SYSTEMS

(71) Applicant: Intel Corporation, Santa Clara, CA (US)

(72) Inventors: Moran Klein, Haifa (IL); Dmitry Paus, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/664,098

(22) Filed: Mar. 20, 2015

(65) Prior Publication Data

US 2016/0275658 A1 Sep. 22, 2016

(51) Int. Cl.
| | | |
|---|---|---|
| *G06K 9/00* | (2006.01) | |
| *G06T 5/00* | (2006.01) | |
| *G06T 5/20* | (2006.01) | |
| *G06T 5/50* | (2006.01) | |
| *G06T 11/00* | (2006.01) | |
| *H04N 1/62* | (2006.01) | |
| *H04N 9/64* | (2006.01) | |
| *H04N 9/67* | (2006.01) | |
| *H04N 5/20* | (2006.01) | |
| *H04N 9/68* | (2006.01) | |

(52) U.S. Cl.
CPC ............ *G06T 5/005* (2013.01); *G06T 5/009* (2013.01); *G06T 5/20* (2013.01); *G06T 5/50* (2013.01); *G06T 11/001* (2013.01); *H04N 1/628* (2013.01); *H04N 5/20* (2013.01); *H04N 9/643* (2013.01); *H04N 9/67* (2013.01); *H04N 9/68* (2013.01); *G06T 2207/10024* (2013.01); *G06T 2207/20021* (2013.01); *G06T 2207/20208* (2013.01)

(58) Field of Classification Search
CPC ....... G06T 5/005; G06T 5/009; G06T 11/001; G06T 5/50; G06T 5/20; G06T 2207/20021; G06T 2207/10024; G06T 2207/20208
USPC ........................................................ 382/167
See application file for complete search history.

(56) References Cited

U.S. PATENT DOCUMENTS

| | | | | |
|---|---|---|---|---|
| 5,315,694 | A * | 5/1994 | Kasano ................. | G06T 11/001 345/591 |
| 2009/0052773 | A1* | 2/2009 | Oohara ................. | G06T 11/001 382/167 |
| 2010/0226572 | A1* | 9/2010 | Adachi ................. | G06T 11/001 382/167 |
| 2015/0036924 | A1* | 2/2015 | Kuusisto .............. | G06K 9/4638 382/165 |

FOREIGN PATENT DOCUMENTS

EP 1857973 11/2007

OTHER PUBLICATIONS

Extended European Search Report for European Patent Application No. 16153689.1, issued on May 6, 2016.

* cited by examiner

*Primary Examiner* — Andrew Moyer
(74) *Attorney, Agent, or Firm* — Green, Howard & Mughal LLP

(57) ABSTRACT

Techniques related to color matching and color conversion are discussed. Such techniques may include determining operators for converting input pixel values to output pixel values in a color space such that the operators may include a set of color conversion matrix operators, a chroma adaptation operator, and/or a luma adaptation operators determined based on one or more perceptual color space values associated with the input pixel values.

22 Claims, 8 Drawing Sheets

COLOR MATCHING FOR IMAGING SYSTEMS

BACKGROUND

In imaging contexts, color reproduction and accuracy is an important feature in image quality and appearance. For example, color errors caused during color conversion may reduce image quality and appearance for end users. In some examples, such color errors may be caused by the limited color space range of an image sensor and/or quantization. Furthermore, such color errors may be caused in the color matching between devices (e.g., a device link). Such color errors may be dependent on image signal processing and/or the calibration of color-conversion of the image signal processing.

It may be desirable to limit or eliminate such color errors and to reproduce a natural or user-preference based image appearance on various displays and/or printed materials with minimal color error. Current color mapping techniques may include single color correction matrix (CCM) color conversion, 1-dimensional (1D) look-up-table (e.g., Gamma Curve) color conversion, or 3D look-up-table in red green blue (RGB)/cyan yellow magenta key or black (CYMK) color space color conversion. However, such techniques suffer problems or limitations such as limitations in accuracy, difficulty or computational complexity in implementation, variance to gain/exposure variations, and the like.

It may be advantageous to perform such color mapping with greater accuracy and/or with less computational requirements. It is with respect to these and other considerations that the present improvements have been needed. Such improvements may become critical as the desire to provide high quality images, to provide better robustness, and to reach any requested color appearance become more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
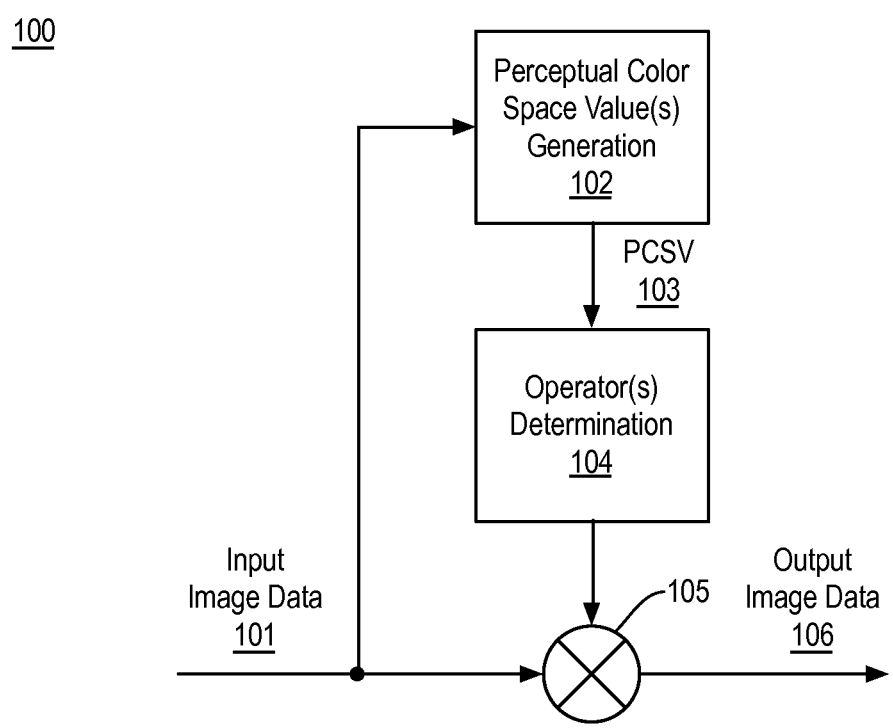
FIG. 1 illustrates an example device for performing color conversion.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, digital cameras, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to color conversion and, in particular, to providing color conversion based on operators determined based on a calibration performed in a perceptual color space.

As described above, in image contexts, color reproduction and accuracy is important to image quality and appearance. For example, it may be advantageous to limit or eliminate color errors in color reproduction or color conversion contexts. In some embodiments discussed herein, performing a color conversion may include generating a perceptual color space value associated with an input pixel of input image data in a first color space. For example, the input image data may be in the red green blue (RGB) color space and the perceptual color space value may be a hue value in a hue chroma luma (HCL) color space or the like. One or more operators may be determined for the input pixel based in part on the perceptual color space value. For example, an operator of the one or more operators may include a selected color conversion matrix operator for converting input pixel values associated with the input pixel to output pixel values. For example, coefficients of a color conversion matrix may be determined based on the perceptual color space value. In some examples, the selected color conversion matrix operator may be determined from a set of predetermined color conversion matrix operators. The set of predetermined color conversion matrix operators may be determined during a calibration phase for example and may include color correction matrices each associated with a sector of a hue chroma plane of a hue chroma luma (HCL) color space.

The selected color conversion matrix operator and any other operators may be applied to the input pixel values in the first color space to provide output pixel values in the first color space. For example, output image data may include the output pixel values. As discussed, one or more additional operators may be determined for the input pixel. The additional operators may include, for example, one or both of a chroma adaptation operator (e.g., for color noise and/or color error reduction and/or gamut compression) and a luma adaptation operator (e.g., for color error reduction and/or gamut compression). For example, applying the chroma adaptation operator may include determining a chroma factor from a set of predetermined (e.g., during calibration) chroma factors and applying the chroma factor to intermediate pixel values (e.g., pixel values determined based on the color conversion matrix operator) without affecting a luma or a hue of the intermediate pixel values. Furthermore, applying the luma adaptation operator may include determining a luma factor from a set of predetermined (e.g., during calibration) luma factors and applying the luma factor to the intermediate pixel values without affecting a chroma or a hue of the intermediate pixel value.

Such techniques may provide for low color error (e.g., average color error, $\Delta E$, of less than 1), which may provide for color differences unnoticeable to the human eye. Such color error results may provide significant improvements for color conversion implementations.

FIG. 1 illustrates an example device 100 for performing color conversion, arranged in accordance with at least some implementations of the present disclosure. As shown in FIG. 1, device 100 may include a perceptual color space values generation module 102, an operators determination module 104, and an operations module 105. Device 100 may be any suitable form factor device such as a computer, a laptop computer, a tablet, a smart phone, a digital camera, a scanner, a multifunction device, a gaming console, a wearable device, a display device, or the like. For example, device 100 may perform color conversion as discussed herein. In some examples, device 100 or the modules of FIG. 1 may be characterized as an apparatus or a system or the like.

As shown, perceptual color space values generation module 102 and operations module 105 may receive input image data 101. Input image data 101 may include any suitable image or imaging data. In some examples, input image data 101 may be received from an image sensor, or the like. For example, input image data 101 may include input pixel values for each pixel of an input image. The input pixel values may be provided for each channel of a color space such as R, G, and B values for input image data in the RGB color space. For example, for an image or image frame or the like in the RGB color space, each pixel of the image frame may have a value associated therewith for R, a value for G, and a value for B (e.g., a value for each of the R channel, the G channel, and the B channel). As used herein, input pixel values may include a value for each such color channel for a pixel or pixels of an input image. For example, generalizing to a 3D color space, input image data 101 may include an X value, a Y value, and a Z value associated with a particular pixel of an input image. However, the input pixel values may include any number of color channel values such as four (for a 4D input color space) or the like (e.g., an n-D input color space). Furthermore, the input pixel values may be in any suitable color space such as the RGB (red, green, blue) color space, the YCbCr (luminance, blue difference, and red difference) color space, the CMYK (cyan, magenta, yellow, key or black) color space, or the like, or any format that uses a color space or the like such as a YUV (Y luminance, U chroma, and V chroma, which may use the YCbCr alike color space) format or the like. Furthermore, input image data 101 may include values for any number of pixels for any type of input image. For example, the input image may include a static image, an image frame of a video, a graphics frame, portions thereof, or the like.

As shown in FIG. 1, perceptual color space values generation module 102 may receive input image data 101 and perceptual color space values generation module 102 may generate one or more perceptual color space values (PCSV) 103 based on input image data 101. For example, for a pixel of input image data 101, perceptual color space values generation module 102 may generate or determine one or more perceptual color space values 103. In an example, perceptual color space value 103 includes a hue value in the HCL color space. In some examples, perceptual color space values 103 may include a hue value and a chroma value in the HCL color space. As shown, perceptual color space values generation module 102 may provide perceptual color space value or values 103 to operators determination module 104 and/or a memory of device 100 (not shown).

Operators determination module 104 may receive perceptual color space value or values 103 from perceptual color space values generation module 102 or memory and operators determination module 104 may generate one or more operators for implementation via operations module 105. For example, the operators may include one or more of a selected color conversion matrix operator, a chroma adaptation operator, and a luma adaptation operator. For example, such one or more operators may be determined for a pixel of input image data 101 (e.g., the operators may be provided on a pixel-by-pixel basis for input image data 101). Operators determination module 104 may provide the operator(s) to operations module 105 and/or a memory or device 100.

Operations module 105 may receive the operator(s) from operators determination module 104 or memory and, operations module 105 may receive input image data 101 from memory or another source (e.g., an image sensor or the like). Operations module 105 may apply one or more operations on input image data 101 based on the received operators to generate output image data 106. For example, for a particular input pixel of input image data 101, operations module 105 may apply one or more operators to generate an output pixel of output image data 106. Such processing may be repeated in serial or in parallel for all or selected pixels of input image data 101 to generate output image data 106. As discussed, input image data 101 may be in a particular color space such as the RGB color space or a particular format. In some examples, output image data 106 may be in the same color space or format. For example, device 100 may provide for generating one or more operators based on a mapping or calibration in a perceptual color space and the one or more operators may be applied in the color space of input image data 101 (e.g., a non-perceptual color space). Such mapping or calibration in a perceptual color space may provide for intuitive and relatively easy color mapping while implementation in the color space of input image data 101 may provide for computational accuracy and efficiency.

As discussed, operators determination module 104 may determine, and operations module 105 may apply, one or more operators based on input image data 101. Such operators may be determined based on input image data 101 and, in some examples, they may be applied in a sequential order as is discussed further herein. In some examples, some of the one or more operators may be commutative operators. For example, one operator of the one or more operators may include a selected color conversion matrix operator. In some examples, the selected color conversion matrix operator may be determined or selected from a set of predetermined color conversion matrix operators. For example, during a calibration or set-up phase, a 3-dimensional (3D) mapping may be performed in a perceptual color space such as the HCL color space, the tint saturation luma (TSL) color space, the LAB (Lightness, A color component, B color component) color space, the long medium short (LMS) color space, or the like.

The mapping color space may be partitioned, and a color conversion matrix operator may be attributed to or provided for each partition or segment. For example, the color conversion matrix operators may be linear operators (or a set of linear operators) that may be applied to input image data 101 to generate output image data 106. In some examples, the color conversion matrix operators may be continuous over or above the color space of input image data 101 and therefore do not require interpolation. In some examples, the selected color conversion matrix operator may be applied to input pixel values for an input pixel of input image data 101 based on a matrix multiplication operation.

For example, a finite number of partitions, segments, or sectors may be defined in the hue chroma plane (e.g., of a perceptual color space) and each such partition, segment, or sector may be provided or attributed to a particular color conversion matrix operator. For example, the color conversion matrix operator may provide a particular or specific linear transformation in the form of a 3×3 matrix. Furthermore, for each input pixel of input image data 101, a particular color conversion matrix operator (e.g., from the predetermined set of color conversion matrix operators) may be selected based on a perceptual color space value such as a hue associated with the input pixel. In some examples, the set of color conversion matrix operators may be generated such that the transition between the discussed partitions, segments, or sectors may be continuous.

As discussed, operators determination module 104 may determine, and operations module 105 may apply, one or more operators based on input image data 101 including a color conversion matrix operators. In some examples, the application of selected color conversion matrix operators to input pixels of input image data 101 may inflate the gamut of input image data 101 and/or a sensor from which input image data 101 was received. Furthermore, in some examples, such application of selected color conversion matrix operators to input pixels of input image data 101 may provide for undesirable color-noise amplification (e.g., particularly in gray, low chroma, regions of input image data 101) and/or undesirable out-of-gamut mapping (e.g., colors that device 100 cannot reproduce; resulting in artifacts and loss of detail).

In some examples, one or both of a chroma adaptation operator (e.g., for color noise and/or color error reduction and/or gamut compression) and a luma adaptation operator (e.g., for color error reduction and/or gamut compression) may be provided via operators determination module 104 and applied via operations module 105. For example, a chroma adaptation operator may be determined for an input pixel of input image data 101 based on perceptual color space values (PCSV) 103. In some examples, the chroma adaption operator may be determined from a set of predetermined chroma adaptation operators. For example, the predetermined chroma adaptation operators may be generated during a calibration or set up phase and implemented via operators determination module 104. In some examples, the chroma adaption operator may be determined based on chroma and luma values in the HCL color space associated with the input pixel value as discussed further herein. For example, the chroma adaption operator may include a chroma factor (e.g., a positive number) implemented via an operation on pixel values determined after implementation of the selected color conversion matrix operator that applies the chroma factor to such pixel values without affecting a luma or a hue of the pixel values, as is discussed further herein.

Furthermore, a luma adaptation operator may be determined for an input pixel of input image data 101 based on perceptual color space values (PCSV) 103. In some examples, the luma adaption operator may be determined from a set of predetermined luma adaptation operators. For example, the predetermined luma adaptation operators may be generated during a calibration or set up phase and implemented via operators determination module 104 as discussed with respect to the color conversion matrix operators and chroma adaptation operators. In some examples, the luma adaption operator may be determined based on chroma and luma values in the HCL color space associated with the input pixel value as discussed further herein. For example, the luma adaption operator may include a luma factor (e.g., a real number) implemented via an operation on pixel values determined after implementation of the selected color conversion matrix operator and, optionally, after implementation of the discussed chroma factor that applies the luma factor to such pixel values without affecting a chroma or a hue of the pixel values, as is discussed further herein.

As discussed, in some examples, one or more operators (e.g., color conversion matrix operators, chroma adaptation operators, and/or luma adaptation operators) may be applied to input pixels in the color space of input image data 101 to generate output image data 106 in the same color space. Furthermore, the one or more operators may be predefined or calibrated in a perceptual color space. Based on one or more perceptual color space values associated with pixel values of pixels of input image data 101, the one or more operators may be determined Such a platform or structure may provide for intuitive perceptual color mapping and efficient implementation in the color space of input image data 101.

Figure 2:
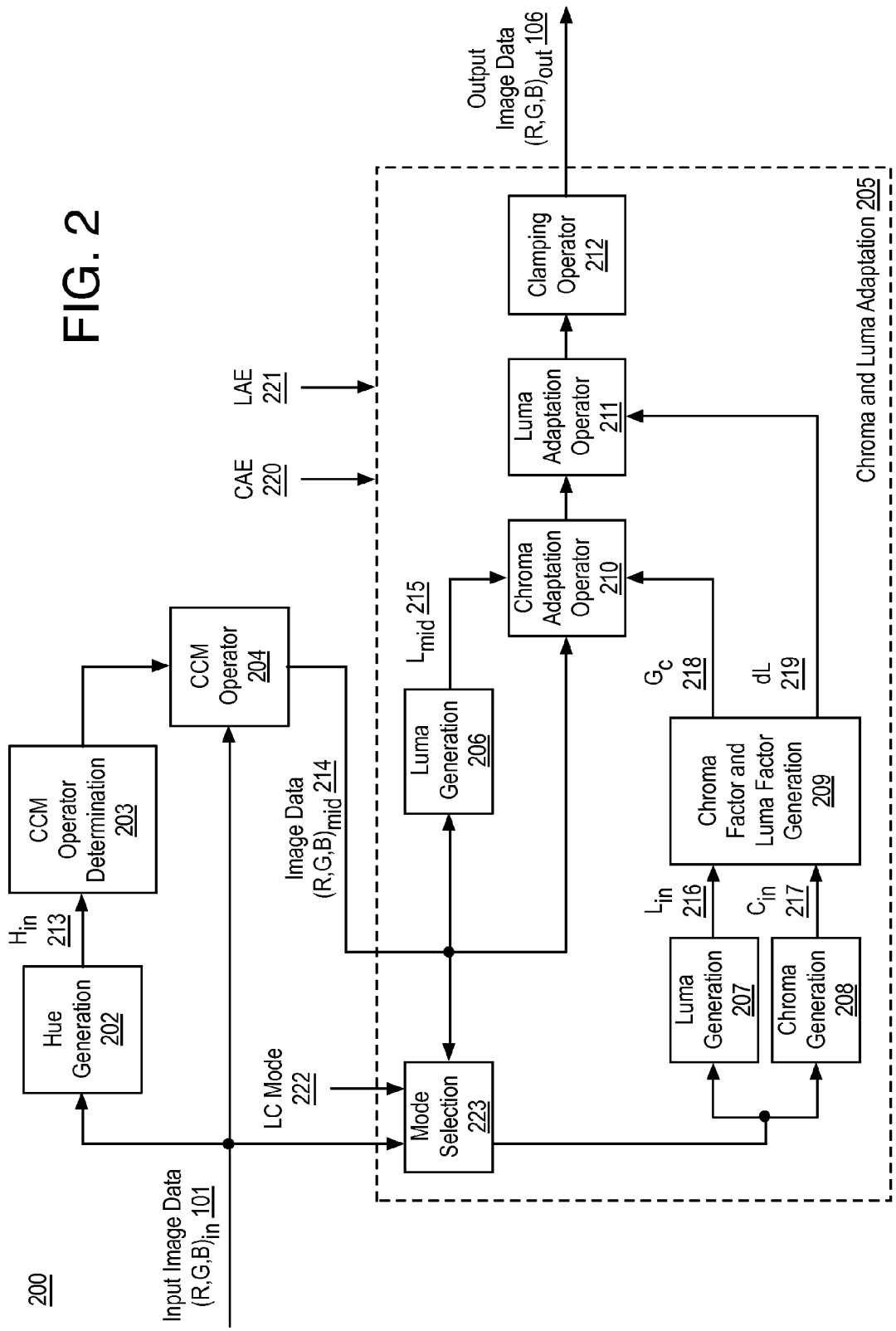
FIG. 2 illustrates an example device for performing color conversion.

FIG. 2 illustrates an example device 200 for performing color conversion, arranged in accordance with at least some implementations of the present disclosure. As shown in FIG. 2, device 200 may include a hue generation module 202, a color conversion matrix (CCM) operator determination module 203, a color conversion matrix (CCM) operator 204, and a chroma and luma adaptation module 205. Also as shown, chroma and luma adaptation module 205 may include a luma generation module 206, a luma generation module 207, a chroma generation module 208, a chroma factor and luma factor generation module 209, a chroma adaptation operator 210, a luma adaptation operator 211, a clamping operator 212, and a mode selection module 223. Device 200 may be any suitable form factor device such as a computer, a laptop computer, a tablet, a smart phone, a digital camera, a scanner, a multifunction device, a gaming console, a wearable device, a display device, or the like. For example, device 200 may perform color conversion as discussed herein. In some examples, device 100 may be characterized as an apparatus or a system or the like.

As shown, device 200 may receive input image data 101 and generate output image data 106. Input image data 101 and output image data 106 may be any suitable image data as discussed with respect to FIG. 1. For example, input image data 101 may include input RGB values $(R, B, G)_{in}$ and output image data may include output RGB values $(R, B, G)_{out}$ as shown. Also as shown, chroma and luma adaptation module 205 may receive chroma adaptation enable (CAE) signal 220 and/or luma adaptation enable (LAE) signal 221, which may be provided via device 200 to control or enable implementation of chroma adaption and/or luma adaptation via chroma and luma adaptation module 205. For example, such signals, when asserted, may be provided for the implementation of chroma and luma adaptation module 205 of parts thereof. In an example, when both chroma adaptation enable signal 220 and luma adaptation enable signal 221 are disabled, chroma and luma adaptation module 205 may be disabled and image data 214 (e.g., image data after application of CCM operators) may be provided as output image data 106. In other examples, image data 214 may be characterized as mid-process image data or intermediate image data or the like. For example, image data 214 may include intermediate pixel values associated with the input pixel values of input image data 101. Furthermore, chroma and luma adaptation module 205 may receive luma chroma value (LC) mode selection signal 222, which may be provided via device 200 to control whether chroma and luma adaptation module 205 uses input image data 101 or image data 214 for the generation of luma value 216 and chroma value 217, as is discussed further herein.

As shown in FIG. 2, hue generation module 202 may receive input image data 101 and hue generation module 202 may generate hue value(s) (e.g., example perceptual color space values) $(H_{in})$ 213 based on input image data 101 for each pixel or selected pixel values of input image 101. Hue value 213 may be generated using any suitable technique or techniques for converting input RGB values for a pixel, $P=(R,G,B)$, to a hue value, H. For example, hue value 213 may be generated according to Equations (1)-(3):

$$H = \operatorname{atan}(\rho/\mu) \quad (1)$$

$$\rho = \frac{\sqrt{3}}{2}(G - B) \quad (2)$$

$$\mu = \frac{2R - G - B}{2} \quad (3)$$

where H may be the hue value, R may be a red color channel value for the current pixel, G may be a green color channel value for the current pixel, and B may be a blue color channel value for the current pixel. As shown, hue generation module 202 may provide hue value 213 to color conversion matrix operator determination module 203 and/or a memory of device 200 (not shown).

Color conversion matrix operator determination module 203 may receive hue value 213 from hue generation module 203 or memory, and color conversion matrix operator determination module 203 may determine a color conversion matrix operator based on hue value 213. The color conversion matrix operator may be, for example, a 3×3 matrix of linear coefficients, or the like. For example, as discussed, in a calibration or setup phase prior to an implementation phase, a finite number of sectors may be defined in the hue chroma plane (e.g., of a perceptual color space such as the HCL color space) and each sector may be provided a particular color conversion matrix operator. For example, the color conversion matrix operator may provide a particular or specific linear transformation in the form of a 3×3 matrix or the like. Color conversion matrix operator determination module 203 may determine the selected color conversion matrix operator (e.g., selected for the current input pixel based on hue value 213) using any suitable technique or techniques. In some examples, color conversion matrix operator determination module 203 may include a look-up-table (LUT) such that the selected color conversion matrix operator may be determined based on indexing the LUT based on hue value 213. For example, a color conversion matrix operator LUT may be implemented via a memory of device 200 and accessed based on hue value 213 to generate the color conversion matrix operator for the current pixel. Color conversion matrix operator determination module 203 may provide the selected color conversion matrix operator to color conversion matrix operator 204 and/or a memory of device 200.

Color conversion matrix operator 204 may receive the selected color conversion matrix operator from color conversion matrix operator determination module 203 or memory and selected color conversion matrix operator 204 may receive input image data 101 from memory or another source such as an imaging sensor, and color conversion matrix operator 204 may apply the selected color conversion matrix operator to input image data 101 to generate image data 214. For example, image data 214 may include RGB values $(R, B, G)_{mid}$ as shown. As discussed, in examples where chroma adaptation enable signal 220 and luma adaptation enable signal 221 are disabled, image data 214 may be provided as output image data. In examples where one or both of chroma adaptation enable signal 220 and luma adaptation enable signal 221 are enabled, image data 214 may be characterized as intermediate image data such that pixels of image data 214 have intermediate pixel values associated with the pixel values of input image data 101 (e.g., the intermediate pixel values being determined based on the operation of CCM operator 204).

Color conversion matrix operator 204 may generate image data 214 including RGB values $(R, B, G)_{mid}$ using any suitable technique or techniques. In some examples, color conversion matrix operator 204 may generate image data 214 including RGB values $(R, B, G)_{mid}$ based on a matrix multiplication of $(R, B, G)_{in}$ and the selected color conversion matrix operator (e.g., $(R, B, G)_{in} \times [CCM] = (R, B, G)_{mid}$). As shown, color conversion matrix operator 204 may provide image data 214 to chroma and luma adaptation module 205 and/or a memory of device 200.

Chroma and luma adaptation module 205 may receive image data 214 and input image data 101, and chroma and luma adaptation module 205 may generate output image data 106. For example, luma generation module 206 of chroma and luma adaptation module 205 may receive image data 214 and luma generation module 206 may generate luma value $(L_{mid})$ 215. Luma generation module 206 may generate luma value 215 based on image data 214 using any suitable technique or techniques for converting input RGB values for a pixel, P=(R,G,B) to a luma value, L. For example, luma generation module 206 may generate luma value 215 based on image data 214 as shown with respect to Equation (4):

$$L = \alpha \cdot R + \beta \cdot G + \gamma \cdot B \quad (4)$$

where L may be the luma value, R may be a red color channel value for the current pixel, G may be a green color channel value for the current pixel, and B may be a blue color channel value for the current pixel, and $\alpha$, $\beta$, and $\gamma$ may be conversion parameters such that $0 \leq \alpha, \beta, \gamma \leq 1$ and $\alpha+\beta+\gamma=1$, for example. As shown, luma generation module 206 may provide luma value 215 chroma adaptation operator 210 and/or a memory of device 200.

As discussed, chroma and luma adaptation module 205 may receive image data 214 and input image data 101, and chroma and luma adaptation module 205 may generate output image data 106. For example, luma generation module 207 and chroma generation module 208 of chroma and luma adaptation module 205 may receive input image data 101 or image data 214 based on the operation of mode selection module 223. For example, chroma and luma adaptation module 205 may receive luma chroma value (LC) mode selection signal 222 and mode selection module may transfer input image data 101 or image data 214 to luma generation module 207 and chroma generation module 208 based on luma chroma value mode selection signal 222. For example, chroma and luma adaptation module 205 may receive luma chroma value mode selection signal 222, which may be provided via device 200 to control whether input image data 101 or image data 214 are used to determine luma value 216 and chroma value 217.

For example, luma generation module 207 of chroma and luma adaptation module 205 may receive input image data 101 or image data 214 and luma generation module 207 may generate luma value $(L_{in})$ 216 based on pixel values of a pixel (e.g., a current pixel) of input image data 101 or image data 214. Luma generation module 207 may generate luma value 216 based on input image data 101 or image data 214 using any suitable technique or techniques for converting input RGB values for a pixel, P=(R,G,B) to a luma value, L. For example, luma generation module 207 may generate luma value 216 based on input image data 101 or image data 214 as discussed with respect to Equation (4) herein. As shown, luma generation module 207 may provide luma value 216 to chroma factor and luma factor generation module 209 and/or a memory of device 200.

Furthermore, chroma generation module 208 of chroma and luma adaptation module 205 may receive input image data 101 or image data 214 and chroma generation module 208 may generate chroma value $(C_{in})$ 217 based on pixel values of a pixel (e.g., a current pixel) of input image data 101 or image data 214. Chroma generation module 208 may generate chroma value 217 based on input image data 101 or image data 214 using any suitable technique or techniques for converting input RGB values for a pixel, P=(R,G,B) to a chroma value, C. For example, chroma generation module 208 may generate chroma value 217 based on input image data 101 as shown with respect to Equation (5):

$$C = \sqrt{\mu^2 + \rho^2} \quad (5)$$

where C may be the chroma value and $\rho$ and $\mu$ may be determined as shown with respect to Equations (2) and (3). As shown, chroma generation module 208 may provide chroma value 217 to chroma factor and luma factor generation module 209 and/or a memory of device 200.

Chroma factor and luma factor generation module 209 may receive luma value 216 and chroma value 217 from luma generation module 207, chroma generation module 208, or memory. Chroma factor and luma factor generation module 209 may generate a chroma factor $(G_c)$ 218 and a luma factor (dL) 219. As shown, chroma factor and luma factor generation module 209 may provide chroma factor 218 to chroma adaptation operator 210 and/or a memory of device 200 and luma factor 219 to luma adaptation operator 211 and/or a memory of device 200.

Chroma factor and luma factor generation module 209 may generate chroma factor 218 and luma factor 219 based on luma value 216 and chroma value 217 (e.g., such that $G_c = G_c(C_{in}, L_{in})$ and $dL = dL(C_{in}, L_{in})$) using any suitable technique or techniques. For example, chroma factor 218 and luma factor 219 may be defined in a setup or calibration phase and implemented via LUT. In some examples, chroma factor and luma factor generation module 209 may include LUT such that chroma factor 218 and luma factor 219 may be determined based on indexing the LUT based on luma value 216 and chroma value 217. For example, a luma factor and chroma factor operator LUTs (e.g., two 2D LUTs) may be implemented via a memory of device 200 and accessed based on luma value 216 and chroma value 217 to generate chroma factor 218 and luma factor 219 for the current pixel. In some examples, such chroma factor 218 and luma factor 219 may be determined based on the LUTs and an interpolation operation based on values determined via the LUTs.

As shown, chroma adaptation operator 210 may receive luma value 215, image data 214, and chroma factor 218. Based on luma value 215 and chroma factor 218, chroma adaptation operator 210 may apply a chroma adaptation to image data 214 to apply chroma factor 218 to image data 214 (e.g., and thereby input image data 101) without affecting a luma or a hue of image data 214 (e.g., and thereby input image data 101). For example, chroma adaptation operator 210 may apply chroma factor 218 to pixel values for the current pixel. Chroma adaptation operator 210 may apply chroma factor 218 using any suitable technique or techniques. For example, chroma adaptation operator 210 may apply chroma factor 218 as shown with respect to Equation (6):

$$(\tilde{R}, \tilde{G}, \tilde{B}) = C(G_C) \circ (R, G, B) \Rightarrow \begin{cases} \tilde{R} = (R - L) \cdot G_C + L \\ \tilde{G} = (G - L) \cdot G_C + L \\ \tilde{B} = (B - L) \cdot G_C + L \end{cases} \quad (6)$$

where ($\tilde{R}$, $\tilde{G}$, $\tilde{B}$) may be the pixel values after application of the chroma adaptation operator, C, (R,G,B) may be input pixel values (e.g., pixel values for the current pixel from image data 214), L may be the luma value for the current pixel (e.g., luma value 215), and $G_c$ may be the chroma factor (e.g., chroma factor 218). As shown in FIG. 2, pixel values after application of the chroma adaptation operator 210 may be provided to luma adaptation operator 211 and/or a memory of device 200.

As shown, luma adaptation operator 211 may receive the pixel values after application of the chroma adaptation operator 210 and luma factor 219. Based on luma factor 219, luma adaptation operator 211 may apply a luma adaptation to the pixel values after application of the chroma adaptation operator 210 to apply luma factor 219 to image data 214 (e.g., and thereby input image data 101) without affecting a chroma or a hue of image data 214 (e.g., and thereby input image data 101). For example, luma adaptation operator 211 may apply luma factor 219 to pixel values (e.g., as received from chroma adaptation operator 210) for the current pixel. Luma adaptation operator 211 may apply luma factor 219 using any suitable technique or techniques. For example, luma adaptation operator 211 may apply luma factor 219 as shown with respect to Equation (7):

$$(\tilde{R}, \tilde{G}, \tilde{B}) = L(dL) \circ (R, G, B) \Rightarrow \begin{cases} \tilde{R} = R + dL \\ \tilde{G} = G + dL \\ \tilde{B} = B + dL \end{cases} \quad (7)$$

where ($\tilde{R}$, $\tilde{G}$, $\tilde{B}$) may be the pixel values after application of the luma adaptation operator, L, (R,G,B) may be input pixel values (e.g., pixel values for the current pixel from chroma adaptation operator 210), and dL may be the luma factor (e.g., luma factor 219). As shown in FIG. 2, pixel values after application of the luma adaptation operator may be provided to clamping operator 212 and/or a memory of device 200.

Clamping operator 212 may receive the pixel values after application of the luma adaptation operator via luma adaptation operator 211 or memory, and clamping operator 212 may clamp pixel values, as needed, to provide output image data 106. Clamping operator 212 may clamp pixel values using any suitable technique or techniques such as moving a pixel value to a nearest available pixel value, if needed. As discussed, clamping operator 212 may provide output image data 106. For example, for the current pixel, an output pixel value (R, B, G)$_{out}$ may be a part of output image data 106. Operations as discussed with respect to device 200 may be performed in serial or in parallel for all or selected pixels of input image data 101, for example, to generate output image data 101.

Device 100 and/or device 200 may provide for color conversion systems and techniques that provide intuitive calibration and tuning and the ability to apply different operators to different colors while being invariant to exposure time and gain. Such systems and techniques may provide for color conversion, color mapping, color matching, color reproduction, color processing, or the like that provide for excellent image appearance with minimal color error.

Figure 3:
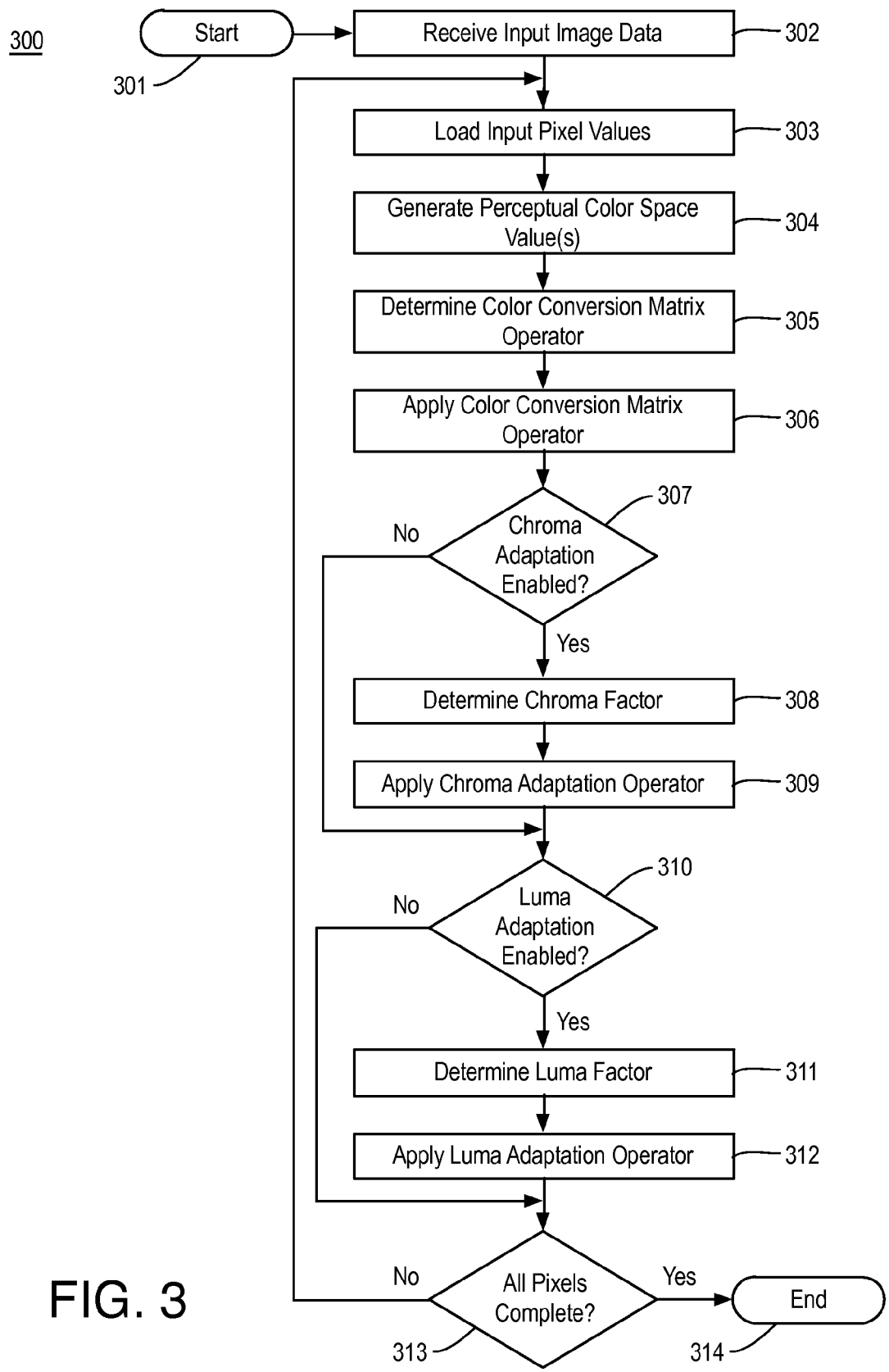
FIG. 3 illustrates an example process for performing color conversion.

FIG. 3 illustrates an example process 300 for performing color conversion, arranged in accordance with at least some implementations of the present disclosure. Process 300 may include one or more operations 301-314 as illustrated in FIG. 3. Process 300 may be performed by a device (e.g., device 100, device 200 or any other devices or systems discussed herein) or portions of process 300 may be performed by a device to perform color conversion. Process 300 or portions thereof may be repeated for any number images, imaging data files, image frames, portions thereof, or the like.

As shown, process 300 may begin from start operation 301 at operation 302, "Receive Input Image Data", where input image data may be received or loaded or the like. For example, input image data 101 as discussed herein may be received from an image sensor or an imaging sensor or the like. For example, the image sensor or imaging sensor may be a part of an imaging device (e.g., a camera, or a camera module of a device such as a smartphone or tablet) or a scanning device or the like. As discussed herein, the input image data may include any suitable image data such as pixel values for pixels of the image data such that the pixel values are each associated with a color channel of a color space. In an example, the input image data includes RGB pixel values and the input image data is in the RGB color space.

Processing may continue at operation 303, "Load Input Pixel Values", where pixel values may be loaded for a pixel of the input image data. For example, the pixel values may include pixel values each associated with a color channel of a color space. In an example, the pixel values include a red value (e.g., R), a green value (e.g., G), and a blue value (e.g., B) for a pixel of the input image data as discussed herein.

Processing may continue at operation 304, "Generate Perceptual Color Space Value(s)", where one or more perceptual color space values may be generated. For example, the one or more perceptual color space values may be associated with a perceptual color space used in a setup or training or calibration phase to define a color mapping between input image values (e.g., from a sensor or the like as discussed) and output image values (e.g. a desired or target color palette or the like). For example, the color mapping in the perceptual color space may be used to generate color conversion operators (e.g., color conversion matrix operators, chroma adaptation operators, and/or luma adaptation operators) that operate in the color space of the input image data received at operation 302. In some examples, the one or more perceptual color space values may be generated to determine a color conversion matrix operator.

Processing may continue at operation 305, "Determine Color Conversion Matrix Operator", where a color conversion matrix operator may be determined based on the one or more perceptual color space values generated at operation 304. For example, for the current pixel (e.g., as loaded at operation 303), a color conversion matrix operator may be determined. As discussed, the color conversion matrix operator may provide a linear transformation from input pixel values to output pixel values in the same color space (e.g., the RGB color space). In an example, the color conversion matrix operator may be determined from a set of color conversion matrix operators that are continuous over partitions, segments, or sectors in the RGB color space or domain.

Processing may continue at operation 306, "Apply Color Conversion Matrix Operator", where the selected color conversion matrix operator may be applied to pixel values of the loaded input pixel to generate output pixel values. For example, the color conversion matrix operator may be applied via matrix multiplication to generate the output pixel values. As discussed herein, in examples where chroma and luma adaptation are disabled, the output pixel values determined at operation 306 may be provided as final output pixel values from process 300. For example, chroma and luma adaptation may be disabled in a device power savings mode or the like.

Processing may continue at decision operation 307, "Chroma Adaptation Enabled?", where a determination may be made as to whether chroma adaptation is enabled. If not, process 300 may continue at decision operation 310, as discussed below. If chroma adaptation is enabled, processing may continue at operation 308, "Determine Chroma Factor", where a chroma factor may be determined for the current pixel. For example, the chroma factor may be determined based on a luma value and a chroma value associated with the current pixel. The luma value and the chroma value may be determined as discussed with respect to Equations (4), (5), (2), and (3) for example. The chroma factor may be determined based on the luma and chroma values using any suitable technique or techniques such as indexing a look up table and interpolation based on the values determined from the look up table.

Processing may continue from operation 308 at operation 309, "Apply Chroma Adaptation Operator", where the chroma adaptation operator enabled at decision operation 307 may be applied. For example, the chroma adaptation operator may be applied based on the chroma factor determined at operation 308 such that the chroma factor is applied to the pixel values from operation 306. For example, the chroma factor may be applied such that neither a luma nor a hue of the pixel value are affected as discussed herein.

Processing may continue at decision operation 310, "Luma Adaptation Enabled?" from operation 309 or operation 307 as discussed. At decision operation 310, a determination may be made as to whether luma adaptation is enabled. If not, process 300 may continue at decision operation 313, as discussed below. If luma adaptation is enabled, processing may continue at operation 311, "Determine Luma Factor", where a luma factor may be determined for the current pixel. For example, the luma factor may be determined based on a luma value and a chroma value associated with the current pixel. The luma value and the chroma value may be determined as discussed with respect to Equations (4), (5), (2), and (3) for example. The luma factor may be determined based on the luma and chroma values using any suitable technique or techniques such as indexing a look up table and interpolation based on the values determined from the look up table.

Processing may continue from operation 311 at operation 312, "Apply Luma Adaptation Operator", where the luma adaptation operator enabled at decision operation 310 may be applied. For example, the luma adaptation operator may be applied based on the luma factor determined at operation 311 such that the luma factor is applied to the pixel values from operation 309. For example, the luma factor may be applied such that neither a chroma nor a hue of the pixel value are affected as discussed herein.

Processing may continue at decision operation 313, "All Pixels Complete?" from operation 312 or operation 310 as discussed. At decision operation 313, a determination may be made as to whether all pixels of the input image data have completed processing. If so, process 300 may end at end operation 314. If not, process 300 may continue at operation 303 on a subsequent pixel as discussed herein. For example, process 300 may continue until all or a selected portion of pixels of the input image data have completed processing.

As discussed, process 300 may be used to perform color conversion. Process 300 may be repeated any number of times for different images, image data files, or the like. Furthermore, process 300 may be performed in serial for pixels of the input image data or in parallel. Furthermore, some operations of process 300 may not be performed in the order presented. For example, in some implementations, luma adaptation (if enabled) may be performed before chroma adaptation (if enabled).

Figure 4:
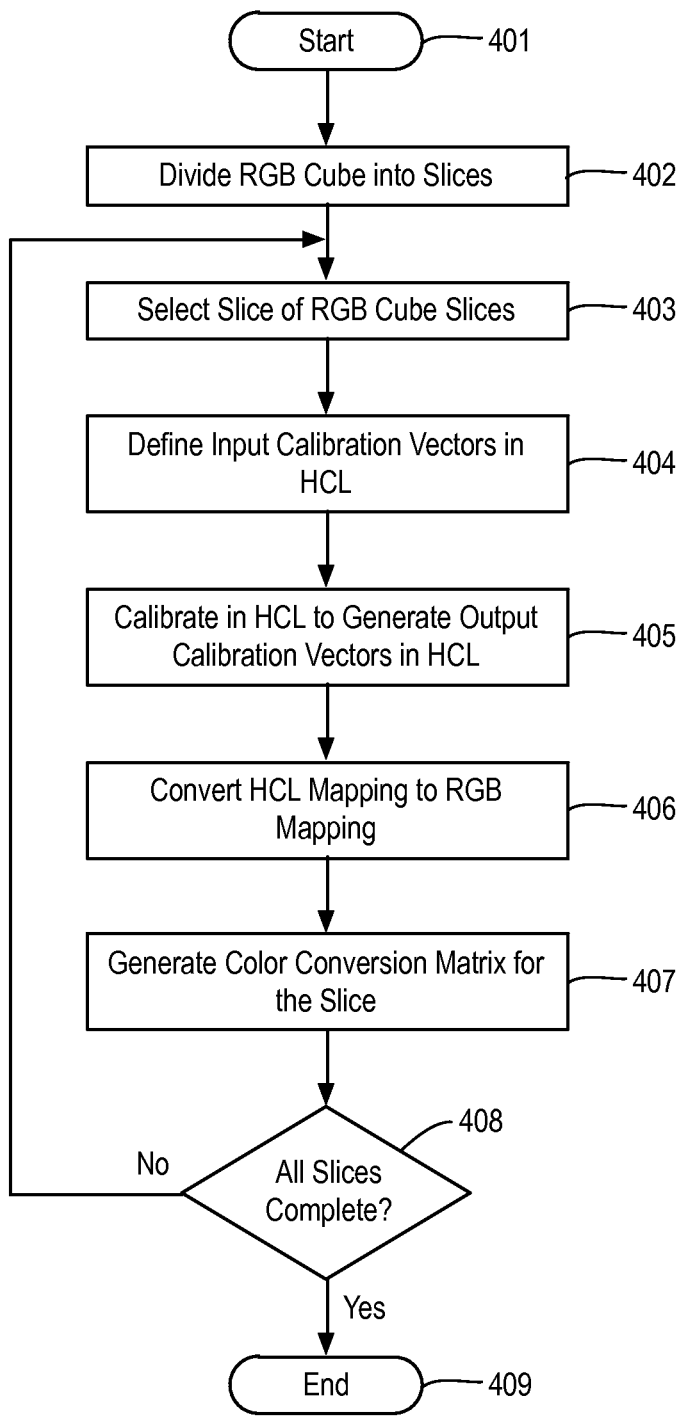
FIG. 4 illustrates an example process for performing color conversion calibration and generating color conversion matrix operators.

FIG. 4 illustrates an example process 400 for performing color conversion calibration and generating color conversion matrix operators, arranged in accordance with at least some implementations of the present disclosure. Process 400 may include one or more operations 401-409 as illustrated in FIG. 4. Process 400 may be performed by a device (e.g., device 100, device 200 or any other devices or systems discussed herein) or portions of process 400 may be performed by a device to perform color conversion calibration and generate color conversion matrix operators. Process 400 or portions thereof may be repeated for any color conversion calibrations, to determine any number of sets of color conversion matrix operators, or the like.

As shown, process 400 may begin from start operation 401 at operation 402, "Divide RGB Cube into Slices", where a color space such as the RGB color space may be divided into slices. In the example of process 400, the operator color space is illustrated as the RGB color space and the perceptual (e.g., calibration) color space is illustrated as the HCL color space for clarity of presentation. However, any suitable operator and perpetual color spaces such as those described herein may be used. Furthermore, in the example of process 400 the operator color space is divided into slices. However, as disused herein, the operator color space may be divided into any suitable sub-spaces or sub-volumes such as sectors, partitions, or segments, or the like.

As discussed, in some examples, the RGB color space (e.g., the RGB color space cube) may be divided into sub-volumes (e.g., slices). In some examples, the RGB color space may be divided into slices such that each slice occupies a continuous range of hue values. In such examples, each slice may be defined and may be spanned by 3 vectors (e.g., one on each facet of the slice and a third vector on the gray axis).

Figure 5:
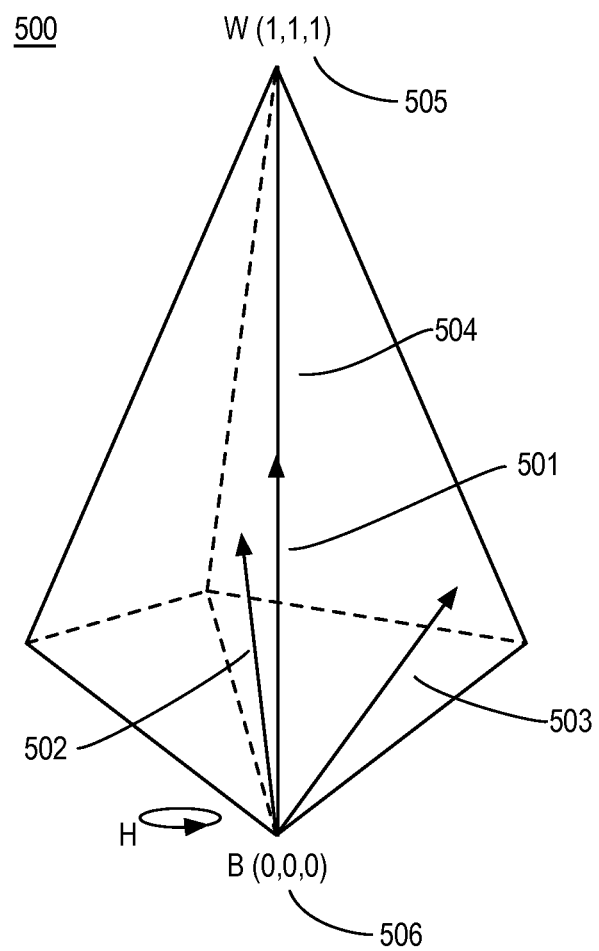
FIG. 5 illustrates an example color space slice.

FIG. 5 illustrates an example color space slice 500, arranged in accordance with at least some implementations of the present disclosure. As shown in FIG. 5, color space slice 500 may include a slice of the RGB color space having or occupying a continuous range of hue values. Furthermore, color space slice 500 may be spanned by 3 vectors: vector 501, vector 502, and vector 503. For example, vector 501 may lie on gray axis 504 (e.g., gray axis 504 may extend between black value (B (0,0,0)) 506 and white value (W (1,1,1)) 505). Furthermore, vector 501 may be an Eigen vector with an Eigen value of 1 for the discussed mapping (e.g., gray remains gray in the discussed mapping). For example, the gray vector may be (0, 0, 0.5) in the HCL color space and (0.5, 0.5, 0.5) in the RGB color space. Also as shown in FIG. 5, each of vectors 502, 503 may be on a facet (e.g., side) of color space slice 500.

Returning to FIG. 4, processing may continue at operation 403, "Select Slice of RGB Cube Slices", where a slice of the slices may be selected. For example, color conversion matrix operators may be generated for each slice of the slices via operations 404-407.

Processing may continue at operation 404, "Define Input Calibration Vectors in HCL", where input calibration vectors may be defined in HCL for the selected slice of the RGB color space. The input calibration vectors may be defined using any suitable technique or techniques. For example, vectors 501, 502, 503, in the HCL color space may define the selected slice.

Processing may continue at operation 405, "Calibrate in HCL to Generate Output Calibration Vectors in HCL", where output calibration vectors may be defined via calibration in the HCL color space. For example, desired color results may be selected via calibration in the HCL color space, which may provide intuitive color selection and/or calibration. The discussed calibration may be performed using any suitable technique or techniques. In some examples, a user may select the resultant color palette or the like. In some examples, the calibration may include an attempt to match a test color palette or the like. The output calibration vectors determined at operation 405 and the input calibration vectors defined at operation 404 may provide an input-to-output mapping of 3 vectors in the HCL color space.

Processing may continue at operation 406, "Convert HCL Mapping to RGB Mapping", where the discussed input-to-output mapping of 3 vectors in the HCL color space may be converted to a mapping in the RGB color space. The HCL mapping to RGB mapping conversion may be performed using any suitable technique or techniques. In some examples, the mapping conversion may be performed as shown in Equation (8):

$$\begin{matrix} \vec{V}_{1,in}^{HCL} \rightarrow \vec{V}_{1,out}^{HCL} \\ \vec{V}_{2,in}^{HCL} \rightarrow \vec{V}_{2,out}^{HCL} \end{matrix} \Rightarrow \begin{matrix} \vec{V}_{1,in}^{RGB} \rightarrow \vec{V}_{1,out}^{RGB} \\ \vec{V}_{2,in}^{RGB} \rightarrow \vec{V}_{2,out}^{RGB} \\ \vec{V}_{gray}^{RGB} \rightarrow \vec{V}_{gray}^{RGB} \end{matrix}, \text{where } \vec{V}_{gray}^{RGB} = (0.5, 0.5, 0.5) \quad (8)$$

where $\vec{V}_{1,in}^{HCL}$ and $\vec{V}_{2,in}^{HCL}$ may be input calibration vectors in the HCL color space, $\vec{V}_{1,out}^{HCL}$ and $\vec{V}_{2,out}^{HCL}$ may be output calibration vectors in the HCL color space, $\vec{V}_{1,in}^{RGB}$ and $\vec{V}_{2,in}^{RGB}$, and $\vec{V}_{gray}^{RGB}$ may be input vectors in the RGB color space, and $\vec{V}_{1,out}^{RGB}$, $\vec{V}_{2,out}^{RGB}$, and $\vec{V}_{gray}^{RGB}$ may be output vectors in the RGB color space.

Processing may continue at operation 407, "Generate Color Conversion Matrix for the Slice", where a color conversion matrix may be determined for the slice selected at operation 403. The color conversion matrix may be determined for the slice using any suitable technique or techniques. In some examples, the color conversion matrix may be determined as shown in Equations (9)-(11):

$$CCM = M_{out}/M_{in} \quad (9)$$

where, $$M_{in} = ((\vec{V}_{1,in}^{RGB})^T (\vec{V}_{2,in}^{RGB})^T (\vec{V}_{gray}^{RGB})^T) \quad (10)$$

$$M_{out} = ((\vec{V}_{1,out}^{RGB})^T (\vec{V}_{2,out}^{RGB})^T (V_{gray}^{RGB})^T) \quad (11)$$

where CCM may be the color conversion matrix for the slice.

Processing may continue at decision operation 408, "All Slices Complete?", where a determination may be made as to whether all slices of the RGB cube have completed processing. If so, process 400 may end at end operation 409. If not, process 400 may continue at operation 403 for a subsequent slice as discussed herein. For example, process 400 may continue until all or a selected portion of slices of RGB color space have completed processing.

As discussed, process 400 may be used to perform calibration and to generate a set of color conversion matrix operators or color conversion matrices. For example, the color conversion matrices for slices of the RGB color space may provide for a set of color conversion matrix operators. Such color conversion matrix operators are continuous over the RGB color space as shown herein. For example, each facet of a slice may be spanned by a calibration vector (e.g. calibration vector 502 or 503) and an Eigen vector (e.g., calibration vector 501), which are adjacent to slices of the RGB color space. Process 400 may be repeated any number of times for calibrations, or preparations of color conversion matrix operators, or the like. Furthermore, process 400 may be performed in serial for slices of the RGB color space or in parallel. Furthermore, some operations of process 400 may not be performed in the order presented.

Figure 6:
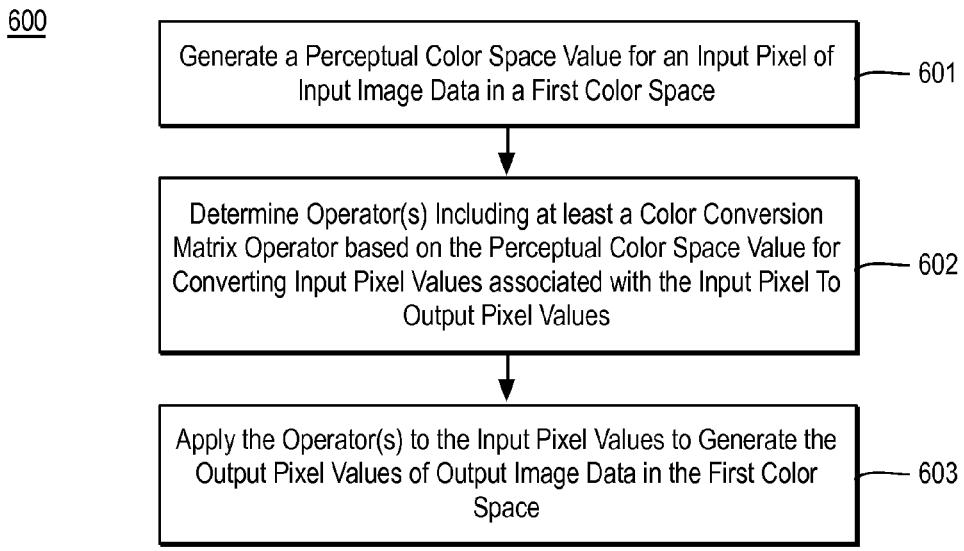
FIG. 6 is a flow diagram illustrating an example process for performing color conversion.

FIG. 6 is a flow diagram illustrating an example process 600 for performing color conversion, arranged in accordance with at least some implementations of the present disclosure. Process 600 may include one or more operations 601-603 as illustrated in FIG. 6. Process 600 may form at least part of color conversion process. By way of non-limiting example, process 600 may form at least part of a color conversion process performed by device 100 or device 200 as discussed herein. Furthermore, process 600 will be described herein with reference to system 700 of FIG. 7.

Figure 7:
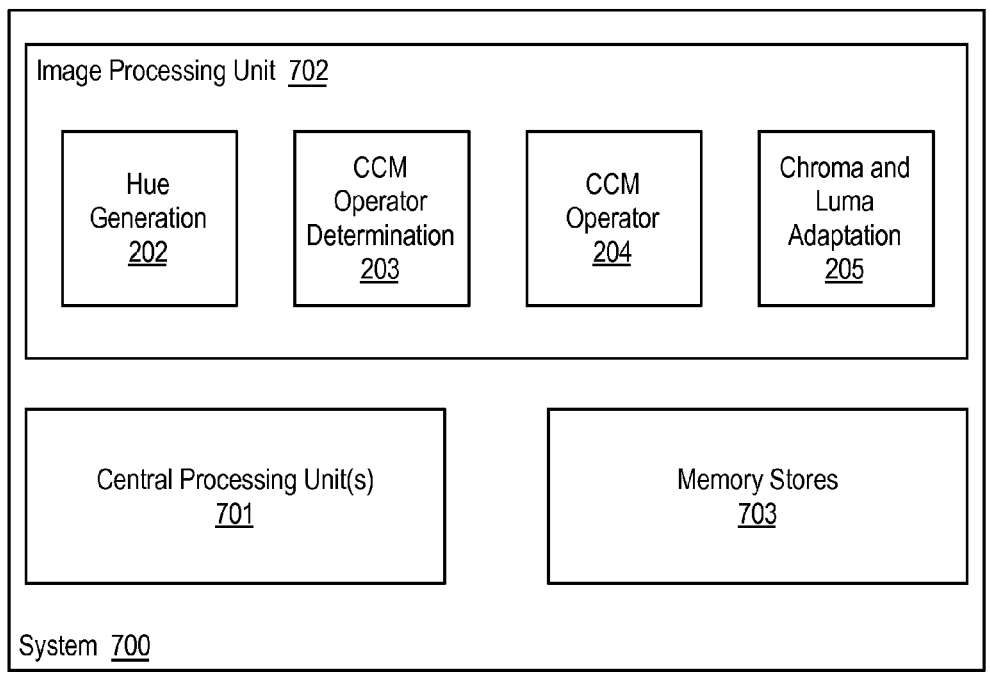
FIG. 7 is an illustrative diagram of an example system for performing color conversion.

FIG. 7 is an illustrative diagram of an example system 700 for performing color conversion, arranged in accordance with at least some implementations of the present disclosure. As shown in FIG. 7, system 700 may include one or more central processing units (CPU) 701, an image processing unit 702, and memory stores 703. Also as shown, image processing unit 702 may include hue generation module 202, color conversion matrix (CCM) operator determination module 203, color conversion matrix (CCM) operator module, and chroma and luma adaptation module 205. Such modules may be implemented to perform operations as discussed herein. Although illustrated with respect to hue generation module 202, image processing unit 702 may implement any perceptual color space value generation module such as perceptual color space values generation module 102. In the example of system 700, memory stores 703 may store input image data, color channel values, pixel data, perceptual color space values, operator values, color conversion matrix values, luma adaption values, luma factors, chroma adaption values, chroma factors, output image data, look-up table values, image data such as mid-process image data, or the like.

As shown, in some examples, hue generation module 202, color conversion matrix operator determination module 203, color conversion matrix operator module 204, and chroma and luma adaptation module 205 may be implemented via image processing unit 702. In other examples, hue generation module 202, color conversion matrix operator determination module 203, color conversion matrix operator module 204, and chroma and luma adaptation module 205 or some of or portions of hue generation module 202, color conversion matrix operator determination module 203, color conversion matrix operator module 204, and chroma and luma adaptation module 205 may be implemented via central processing units 701 or a graphics processing unit (not shown) of system 700. In yet other examples, hue generation module 202, color conversion matrix operator determination module 203, color conversion matrix operator module 204, and chroma and luma adaptation module 205 or some of or portions of hue generation module 202, color conversion matrix operator determination module 203, color conversion matrix operator module 204, and chroma and luma adaptation module 205 may be implemented via an imaging processing pipeline, graphics pipeline, or the like.

Image processing unit 702 may include any number and type of graphics or image processing units, that may provide the operations as discussed herein. Such operations may be implemented via software or hardware or a combination thereof. For example, image processing unit 702 may include circuitry dedicated to manipulate image data or the like obtained from memory stores 703 (e.g., raw input images, pixel values, or the like). Central processing units 701 may include any number and type of processing units or modules that may provide control and other high level functions for system 700 and/or provide any operations as discussed herein. Memory stores 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 703 may be implemented by cache memory.

In an embodiment hue generation module 202, color conversion matrix operator determination module 203, color conversion matrix operator module 204, and chroma and luma adaptation module 205 or some of or portions of hue generation module 202, color conversion matrix operator determination module 203, color conversion matrix operator module 204, and chroma and luma adaptation module 205 may be implemented via an execution unit (EU) of image processing unit 702. The EU may include, for example, programmable logic or circuitry such as a logic core or cores that may provide a wide array of programmable logic functions. In an embodiment, hue generation module 202, color conversion matrix operator determination module 203, color conversion matrix operator module 204, and chroma and luma adaptation module 205 or some of or portions of hue generation module 202, color conversion matrix operator determination module 203, color conversion matrix operator module 204, and chroma and luma adaptation module 205 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, hue generation module 202, color conversion matrix operator determination module 203, color conversion matrix operator module 204, and chroma and luma adaptation module 205 or some of or portions of hue generation module 202, color conversion matrix operator determination module 203, color conversion matrix operator module 204, and chroma and luma adaptation module 205 may be implemented via an application specific integrated circuit (ASIC). The ASIC may include an integrated circuitry customized to perform the operations discussed herein.

Returning to discussion of FIG. 6, process 600 may begin at operation 601, "Generate a Perceptual Color Space Value for an Input Pixel of Input Image Data in a First Color Space", where a perceptual color space value associated with an input pixel of input image data in a first color space may be generated. For example, the perceptual color space value may be a value in the hue chroma luma (HCL) color space and the first color space may be an operator color space such as the red green blue (RGB) color space. For example, the perceptual color space value may be a hue value, a chroma value, or a luma value. In some examples, more than one perceptual color space value may be generated at operation 601. For example, hue generation module 202 as implemented via image processing unit 702 may generate a hue value.

Processing may continue at operation 602, "Determine Operator(s) Including at least a Color Conversion Matrix Operator based on the Perceptual Color Space Value for Converting Input Pixel Values associated with the Input Pixel To Output Pixel Values", where one or more operators may be determined for the input pixel for converting input pixel values associated with the input pixel to output pixel values. For example, the operators may include at least a selected color conversion matrix operator from a set of predetermined color conversion matrix operators, wherein the selected color conversion matrix operator is determined based on the perceptual color space value associated with the input pixel. For example, color conversion matrix operator determination module 203 as implemented via image processing unit 702 may determine the color conversion matrix operator and chroma and luma adaptation module 206 as implemented via image processing unit 702 may determine a chroma adaptation operator (if implemented) and a chroma adaptation operator (if implemented).

Processing may continue at operation 603, "Apply the Operator(s) to the Input Pixel Values to Generate the Output Pixel Values of Output Image Data in the First Color Space", where the one or more operators may be applied to the input pixel values in the first color space to generate the output pixel values, wherein output image data in the first color space comprises the output pixel values. For example, color conversion matrix operator module 204 as implemented image processing unit 702 may apply the selected color conversion matrix operator and chroma and luma adaptation module 206 as implemented via image processing unit 702 may apply the chroma adaptation operator (if implemented) and the chroma adaptation operator (if implemented).

As discussed, the color conversion matrix operator may be selected from a set of predetermined color conversion matrix operators and applied. In some examples, the set of predetermined color conversion matrix operators may include color correction matrices each associated with a sector of a hue chroma plane of a hue chroma luma (HCL) color space. For example, the color correction matrices may be continuous over segments or the like in the first color space.

In examples where a chroma adaptation operator is applied, the chroma adaptation operator may apply a chroma factor to intermediate pixel values associated with the input pixel values without affecting a luma or a hue of the intermediate pixel values. For example, the chroma factor may be determined from a set of predetermined chroma factors based on a chroma value and a luma value associated with at least one of the input pixel values or the intermediate pixel values. The set of predetermined chroma factors may be defined during a calibration phase as discussed herein. Similarly, in examples where a luma adaptation operator is applied, the luma adaptation operator may apply a luma factor to intermediate pixel values associated with the input pixel values without affecting a chroma or a hue of the intermediate pixel values. For example, the luma factor may be determined from a set of predetermined luma factors based on a chroma value and a luma value associated with at least one of the input pixel values or the intermediate pixel values. For example, the set of predetermined luma factors may be defined during the calibration phase.

As discussed, the calibration phase may determine the set of predetermined color conversion matrix operators and the set of chroma adaptation operators (if implemented) and the set of luma adaptation operators (if implemented). For example, the calibration phase may determine the set of predetermined color conversion matrix operators by dividing the first color space into a plurality of slices, defining input calibration vectors for a first slice of the plurality of slices in a perceptual color space, generating output calibration vectors for the first slice in the perceptual color space, converting the input and output calibration vectors in the perceptual color space to a mapping in the first color space, and generating a first color conversion matrix operator of the set of predetermined color conversion matrix operators based on the mapping in the first color space. In some examples, the operations of the calibration phase may be implemented via image processing unit 702, central processing units 701, and/or other units or modules of system 700 and, in other examples, the operations of the calibration phase may be implemented or performed via a remote device and the calibration data or results may be implemented via system 700 or the like.

Process 600 may provide for color conversion for image data. Process 600 may be repeated any number of times either in series or in parallel for any number of images, image data files, or portions of images or image data files, or the like.

Various components of the systems described herein may be implemented in software, firmware, and/or hardware and/or any combination thereof. For example, various components of device 100, device 200, system 700, system 800, or device 900 may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, device 200, system 700, system 800, or device 900, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
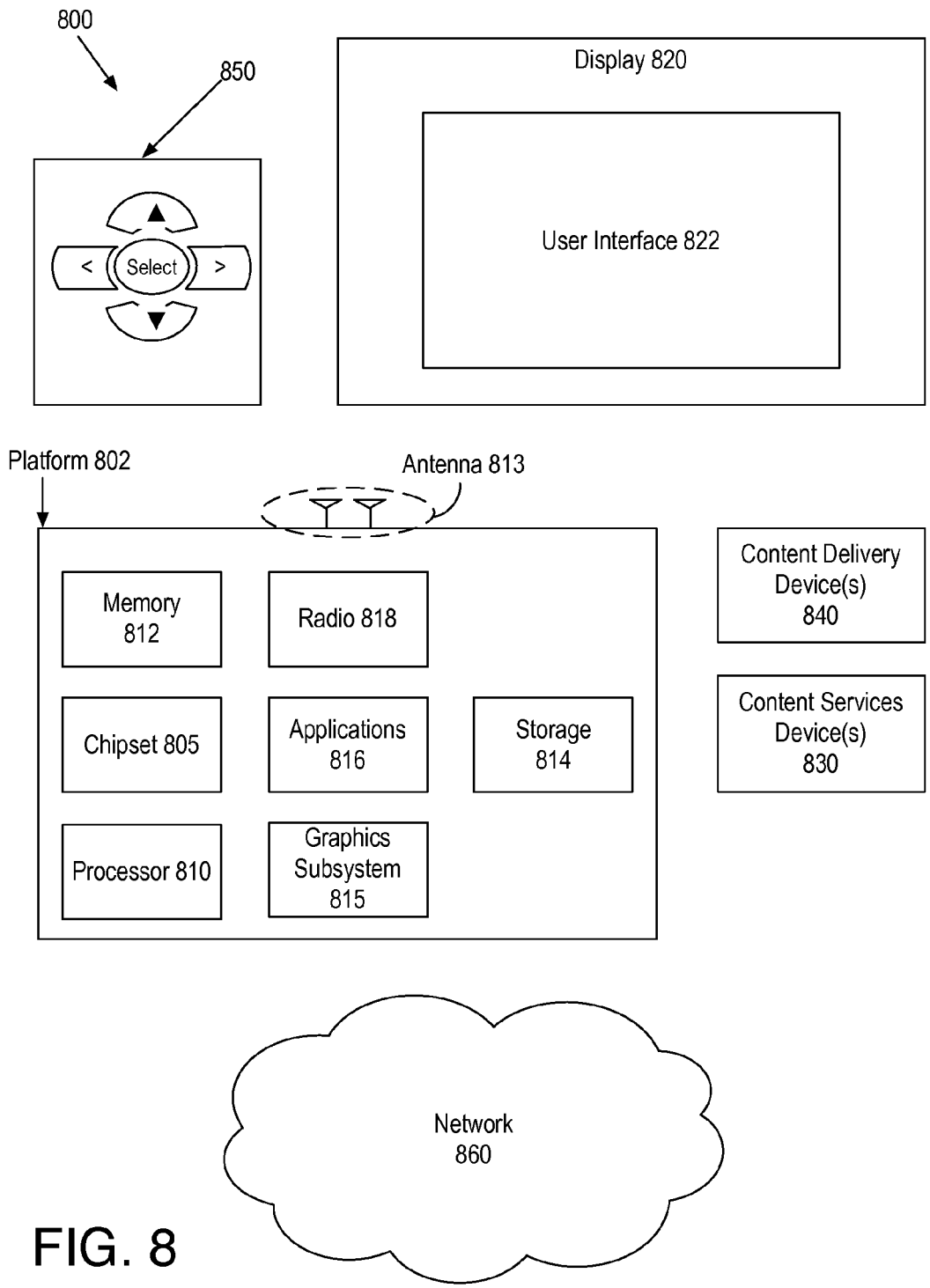
FIG. 8 is an illustrative diagram of an example system.

FIG. 8 is an illustrative diagram of an example system 800, arranged in accordance with at least some implementations of the present disclosure. In various implementations, system 800 may be a computing system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, scanner, printer, multi-function device, and so forth.

In various implementations, system 800 includes a platform 802 coupled to a display 820. Platform 802 may receive content from a content device such as content services device(s) 830 or content delivery device(s) 840 or other similar content sources such as a printer/scanner. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still images, graphics, or video for display. Graphics subsystem 815 may be a graphics processing unit (GPU), a visual processing unit (VPU), or an image processing unit, for example. In some examples, graphics subsystem 815 may perform scanned image rendering as discussed herein. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any flat panel monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of navigation controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, navigation controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off" In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
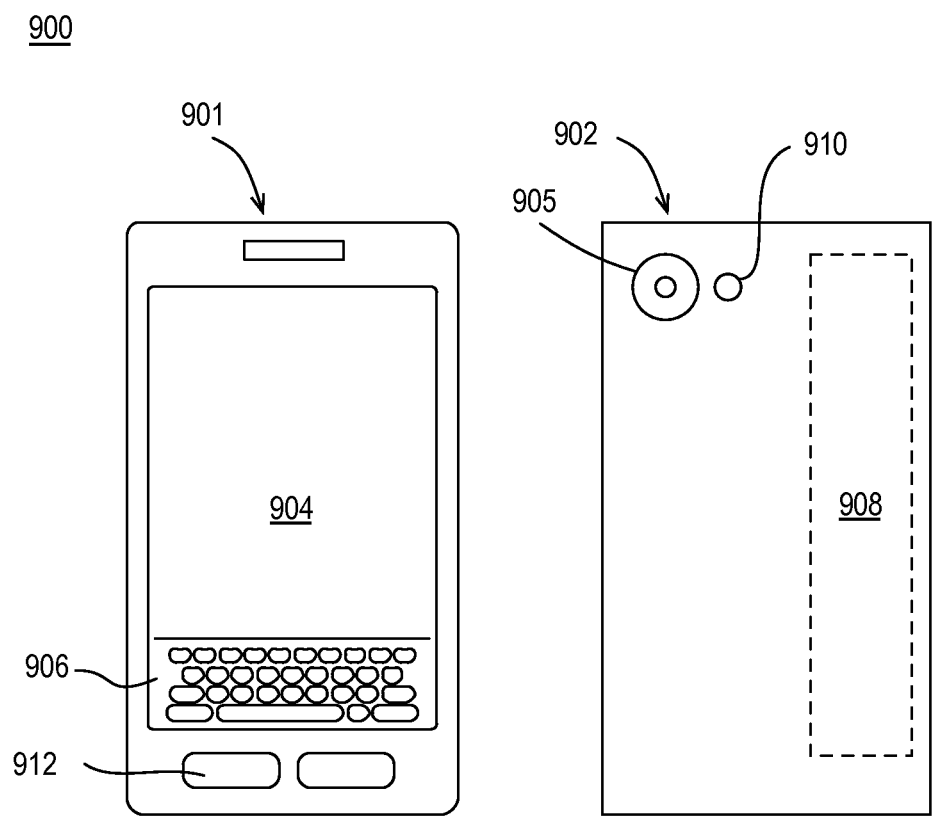
FIG. 9 illustrates an example small form factor device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 800 may be implemented via device 900. In other examples, device 100, device 200, system 700, or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include a camera 905 (e.g., including a lens, an aperture, and an imaging sensor) and a flash 910 integrated into back 902 (or elsewhere) of device 900. In other examples, camera 905 and flash 910 may be integrated into front 901 of device 900 or both front and back cameras may be provided. Camera 905 and flash 910 may be components of a camera module to originate image data processed into streaming video that is output to display 904 and/or communicated remotely from device 900 via antenna 908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for performing color conversion comprises generating a perceptual color space value associated with an input pixel of input image data in a first color space, determining, for the input pixel, one or more operators for converting input pixel values associated with the input pixel to output pixel values, wherein the operators comprise at least a selected color conversion matrix operator from a set of predetermined color conversion matrix operators, wherein the selected color conversion matrix operator is determined based at least in part on the perceptual color space value associated with the input pixel, and applying the one or more operators to the input pixel values in the first color space to generate the output pixel values, wherein output image data in the first color space comprises the output pixel values.

Further to the first embodiments, the first color space comprises a red green blue (RGB) color space and the perceptual color space value comprises a hue value of a hue chroma luma (HCL) color space.

Further to the first embodiments, the set of predetermined color conversion matrix operators comprises color correction matrices each associated with a sector of a hue chroma plane of a hue chroma luma (HCL) color space.

Further to the first embodiments, the set of predetermined color conversion matrix operators comprises color correction matrices each associated with a sector of a hue chroma plane of a hue chroma luma (HCL) color space and the color correction matrices are continuous over segments in the first color space.

Further to the first embodiments, the one or more operators further comprise a chroma adaptation operator and a luma adaptation operator.

Further to the first embodiments, the one or more operators further comprise a chroma adaptation operator to apply a chroma factor to intermediate pixel values associated with the input pixel values without affecting a luma or a hue of the intermediate input pixel values.

Further to the first embodiments, the one or more operators further comprise a chroma adaptation operator to apply a chroma factor to intermediate pixel values associated with the input pixel values without affecting a luma or a hue of the intermediate input pixel values and the method further comprise determining the chroma factor from a set of predetermined chroma factors based on a chroma value and a luma value associated with at least one of the input pixel values or the intermediate pixel values.

Further to the first embodiments, the one or more operators further comprise a luma adaptation operator to apply a luma factor to intermediate pixel values associated with the input pixel values without affecting a chroma or a hue of the intermediate pixel values.

Further to the first embodiments, the one or more operators further comprise a luma adaptation operator to apply a luma factor to intermediate pixel values associated with the input pixel values without affecting a chroma or a hue of the intermediate pixel values and the method further comprises determining the luma factor from a set of predetermined luma factors based on a chroma value and a luma value associated with at least one of the input pixel values or the intermediate pixel values.

Further to the first embodiments, the first color space comprises a red green blue (RGB) color space and the perceptual color space value comprises a hue value of a hue chroma luma (HCL) color space, and the one or more operators further comprise a chroma adaptation operator to apply a chroma factor to intermediate pixel values associated with the input pixel value without affecting a luma or a hue of the input pixel value and a luma adaptation operator to apply a luma factor to the intermediate pixel value without affecting a chroma or the hue of the input pixel value.

Further to the first embodiments, the first color space comprises a red green blue (RGB) color space and the perceptual color space value comprises a hue value of a hue chroma luma (HCL) color space, the one or more operators further comprise a chroma adaptation operator to apply a chroma factor to intermediate pixel values associated with the input pixel value without affecting a luma or a hue of the input pixel value and a luma adaptation operator to apply a luma factor to the intermediate pixel value without affecting a chroma or the hue of the input pixel value, and the method further comprises dividing the first color space into a plurality of slices, defining input calibration vectors for a first slice of the plurality of slices in a perceptual color space, generating output calibration vectors for the first slice in the perceptual color space, converting the input and output calibration vectors in the perceptual color space to a mapping in the first color space, and generating a first color conversion matrix operator of the set of predetermined color conversion matrix operators based on the mapping in the first color space.

In one or more second embodiments, a system for performing color conversion comprises a memory configured to receive input image data in a first color space and an image processing unit coupled to the memory, the image processing unit to generate a perceptual color space value associated with an input pixel of the input image data, to determine, for the input pixel, one or more operators to convert input pixel values associated with the input pixel to output pixel values, wherein the operators comprise at least a selected color conversion matrix operator from a set of predetermined color conversion matrix operators and the selected color conversion matrix operator is determined based at least in part on the perceptual color space value associated with the input pixel, and to apply the one or more operators to the input pixel values in the first color space to generate the output pixel values, wherein output image data in the first color space comprises the output pixel values.

Further to the second embodiments, the first color space comprises a red green blue (RGB) color space and the perceptual color space value comprises a hue value of a hue chroma luma (HCL) color space.

Further to the second embodiments, the set of predetermined color conversion matrix operators comprises color correction matrices each associated with a sector of a hue chroma plane of a hue chroma luma (HCL) color space.

Further to the second embodiments, the one or more operators further comprise a chroma adaptation operator and a luma adaptation operator.

Further to the second embodiments, the one or more operators further comprise a chroma adaptation operator to apply a chroma factor to intermediate pixel values associated with the input pixel values without affecting a luma or a hue of the intermediate pixel values.

Further to the second embodiments, the one or more operators further comprise a chroma adaptation operator to apply a chroma factor to intermediate pixel values associated with the input pixel values without affecting a luma or a hue of the intermediate pixel values and the image processing unit is further to determine the chroma factor from a set of predetermined chroma factors based on a chroma value and a luma value associated with at least one of the input pixel values or the intermediate pixel values.

Further to the second embodiments, the one or more operators further comprise a chroma adaptation operator to apply a chroma factor to intermediate pixel values associated with the input pixel values without affecting a luma or a hue of the intermediate pixel values and the image processing unit is further to determine the chroma factor from a set of predetermined chroma factors based on a chroma value and a luma value associated with at least one of the input pixel values or the intermediate pixel values.

Further to the second embodiments, the one or more operators further comprise a luma adaptation operator to apply a luma factor to intermediate pixel values associated with the input pixel values without affecting a chroma or a hue of the intermediate pixel values.

Further to the second embodiments, the one or more operators further comprise a luma adaptation operator to apply a luma factor to intermediate pixel values associated with the input pixel values without affecting a chroma or a hue of the intermediate pixel values and the image processing unit is further to determine the luma factor from a set of predetermined luma factors based on a chroma value and a luma value associated with at least one of the input pixel values or the intermediate pixel values.

Further to the second embodiments, the one or more operators further comprise a luma adaptation operator to apply a luma factor to intermediate pixel values associated with the input pixel values without affecting a chroma or a hue of the intermediate pixel values and the image processing unit is further to determine the luma factor from a set of predetermined luma factors based on a chroma value and a luma value associated with at least one of the input pixel values or the intermediate pixel values.

Further to the second embodiments, the first color space comprises a red green blue (RGB) color space and the perceptual color space value comprises a hue value of a hue chroma luma (HCL) color space, and the one or more operators further comprise a chroma adaptation operator to apply a chroma factor to intermediate pixel values associated with the input pixel values without affecting a luma or a hue of the intermediate pixel values and a luma adaptation operator to apply a luma factor to the intermediate pixel values without affecting a chroma or the hue of the intermediate pixel values.

In one or more third embodiments, a system for performing color conversion comprises means for generating a perceptual color space value associated with an input pixel of input image data in a first color space, means for determining, for the input pixel, one or more operators for converting input pixel values associated with the input pixel to output pixel values, wherein the operators comprise at least a selected color conversion matrix operator from a set of predetermined color conversion matrix operators, wherein the selected color conversion matrix operator is determined based at least in part on the perceptual color space value associated with the input pixel, and means for applying the one or more operators to the input pixel values in the first color space to generate the output pixel values, wherein output image data in the first color space comprises the output pixel values.

Further to the third embodiments, the first color space comprises a red green blue (RGB) color space and the perceptual color space value comprises a hue value of a hue chroma luma (HCL) color space.

Further to the third embodiments, the set of predetermined color conversion matrix operators comprises color correction matrices each associated with a sector of a hue chroma plane of a hue chroma luma (HCL) color space.

Further to the third embodiments, the set of predetermined color conversion matrix operators comprises color correction matrices each associated with a sector of a hue chroma plane of a hue chroma luma (HCL) color space and the color correction matrices are continuous over segments in the first color space.

Further to the third embodiments, the one or more operators further comprise a chroma adaptation operator and a luma adaptation operator.

Further to the third embodiments, the one or more operators further comprise a chroma adaptation operator to apply a chroma factor to intermediate pixel values associated with the input pixel values without affecting a luma or a hue of the intermediate input pixel values.

Further to the third embodiments, the one or more operators further comprise a chroma adaptation operator to apply a chroma factor to intermediate pixel values associated with the input pixel values without affecting a luma or a hue of the intermediate input pixel values and the system further comprises means for determining the chroma factor from a set of predetermined chroma factors based on a chroma value and a luma value associated with at least one of the input pixel values or the intermediate pixel values.

Further to the third embodiments, the one or more operators further comprise a luma adaptation operator to apply a luma factor to intermediate pixel values associated with the input pixel values without affecting a chroma or a hue of the intermediate pixel values.

Further to the third embodiments, the one or more operators further comprise a luma adaptation operator to apply a luma factor to intermediate pixel values associated with the input pixel values without affecting a chroma or a hue of the intermediate pixel values and the system further comprises means for determining the luma factor from a set of predetermined luma factors based on a chroma value and a luma value associated with at least one of the input pixel values or the intermediate pixel values.

Further to the third embodiments, the first color space comprises a red green blue (RGB) color space and the perceptual color space value comprises a hue value of a hue chroma luma (HCL) color space, and the one or more operators further comprise a chroma adaptation operator to apply a chroma factor to intermediate pixel values associated with the input pixel value without affecting a luma or a hue of the input pixel value and a luma adaptation operator to apply a luma factor to the intermediate pixel value without affecting a chroma or the hue of the input pixel value.

Further to the third embodiments, the first color space comprises a red green blue (RGB) color space and the perceptual color space value comprises a hue value of a hue chroma luma (HCL) color space, the one or more operators further comprise a chroma adaptation operator to apply a chroma factor to intermediate pixel values associated with the input pixel value without affecting a luma or a hue of the input pixel value and a luma adaptation operator to apply a luma factor to the intermediate pixel value without affecting a chroma or the hue of the input pixel value, and the system further comprises means for dividing the first color space into a plurality of slices, means for defining input calibration vectors for a first slice of the plurality of slices in a perceptual color space, means for generating output calibration vectors for the first slice in the perceptual color space, means for converting the input and output calibration vectors in the perceptual color space to a mapping in the first color space, and means for generating a first color conversion matrix operator of the set of predetermined color conversion matrix operators based on the mapping in the first color space.

In one or more fourth embodiments, at least one machine readable medium comprises a plurality of instructions that, in response to being executed on a device, cause the device to perform color conversion by generating a perceptual color space value associated with an input pixel of input image data in a first color space, determining, for the input pixel, one or more operators for converting input pixel values associated with the input pixel to output pixel values, wherein the operators comprise at least a selected color conversion matrix operator from a set of predetermined color conversion matrix operators, wherein the selected color conversion matrix operator is determined based at least in part on the perceptual color space value associated with the input pixel, and applying the one or more operators to the input pixel values in the first color space to generate the output pixel values, wherein output image data in the first color space comprises the output pixel values.

Further to the fourth embodiments, the first color space comprises a red green blue (RGB) color space and the perceptual color space value comprises a hue value of a hue chroma luma (HCL) color space.

Further to the fourth embodiments, the set of predetermined color conversion matrix operators comprises color correction matrices each associated with a sector of a hue chroma plane of a hue chroma luma (HCL) color space and the color correction matrices are continuous over segments in the first color space.

Further to the fourth embodiments, the one or more operators further comprise a chroma adaptation operator to apply a chroma factor to intermediate pixel values associated with the input pixel values without affecting a luma or a hue of intermediate pixel values and the machine readable medium comprises further instructions that, in response to being executed on the device, cause the device to perform color conversion by determining the chroma factor from a set of predetermined chroma factors based on a chroma value and a luma value associated with at least one of the input pixel values or the intermediate pixel values.

Further to the fourth embodiments, the one or more operators further comprise a luma adaptation operator to apply a luma factor to intermediate pixel values associated with the input pixel values without affecting a chroma or a hue of the intermediate pixel values and the machine readable medium comprising further instructions that, in response to being executed on the device, cause the device to perform color conversion by determining the luma factor from a set of predetermined luma factors based on a chroma value and a luma value associated with at least one of the input pixel values or the intermediate pixel values.

Further to the fourth embodiments, the machine readable medium comprises further instructions that, in response to being executed on the device, cause the device to perform color conversion by dividing the first color space into a plurality of slices, defining input calibration vectors for a first slice of the plurality of slices in a perceptual color space, generating output calibration vectors for the first slice in the perceptual color space, converting the input and output calibration vectors in the perceptual color space to a mapping in the first color space, and generating a first color conversion matrix operator of the set of predetermined color conversion matrix operators based on the mapping in the first color space.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing color conversion comprising:
  generating a perceptual color space value associated with an input pixel of input image data in a first color space, wherein the first color space is divided into a plurality of slices, input calibration vectors are defined for a first slice of the plurality of slices in a perceptual color space, and output calibration vectors are provided for the first slice of the perceptual color space;
  converting the input and output calibration vectors in the perceptual color space to a mapping in the first color space;
  generating a first color conversion matrix operator of the set of predetermined color conversion matrix operators based on the mapping in the first color space;
  determining, for the input pixel, one or more operators for converting input pixel values associated with the input pixel to output pixel values, wherein the operators comprise at least the first color conversion matrix operator selected from the set of predetermined color conversion matrix operators, wherein the first color conversion matrix operator is selected based at least in part on the perceptual color space value associated with the input pixel; and
  applying the one or more operators to the input pixel values in the first color space to generate the output pixel values, wherein output image data in the first color space comprises the output pixel values.

2. The method of claim 1, wherein the first color space comprises a red green blue (RGB) color space and the perceptual color space value comprises a hue value of a hue chroma luma (HCL) color space.

3. The method of claim 1, wherein the set of predetermined color conversion matrix operators comprises color correction matrices each associated with a sector of a hue chroma plane of a hue chroma luma (HCL) color space.

4. The method of claim 3, wherein the color correction matrices are continuous over segments in the first color space.

5. The method of claim 1, wherein the one or more operators further comprise a chroma adaptation operator and a luma adaptation operator.

6. The method of claim 1, wherein the one or more operators further comprise a chroma adaptation operator to apply a chroma factor to intermediate pixel values associated with the input pixel values without affecting a luma or a hue of the intermediate input pixel values.

7. The method of claim 6, further comprising:
  determining the chroma factor from a set of predetermined chroma factors based on a chroma value and a luma value associated with at least one of the input pixel values or the intermediate pixel values.

8. The method of claim 1, wherein the one or more operators further comprise a luma adaptation operator to apply a luma factor to intermediate pixel values associated with the input pixel values without affecting a chroma or a hue of the intermediate pixel values.

9. The method of claim 8, further comprising:
determining the luma factor from a set of predetermined luma factors based on a chroma value and a luma value associated with at least one of the input pixel values or the intermediate pixel values.

10. The method of claim 1, wherein the first color space comprises a red green blue (RGB) color space and the perceptual color space value comprises a hue value of a hue chroma luma (HCL) color space, and wherein the one or more operators further comprise a chroma adaptation operator to apply a chroma factor to intermediate pixel values associated with the input pixel value without affecting a luma or a hue of the input pixel value and a luma adaptation operator to apply a luma factor to the intermediate pixel value without affecting a chroma or the hue of the input pixel value.

11. A system for performing color conversion comprising:
a memory configured to receive input image data in a first color space; and
a processor coupled to the memory, the processor to generate a perceptual color space value associated with an input pixel of the input image data, wherein the first color space is divided into a plurality of slices, input calibration vectors are defined for a first slice of the plurality of slices in a perceptual color space, and output calibration vectors are provided for the first slice of the perceptual color space, to convert the input and output calibration vectors in the perceptual color space to a mapping in the first color space, to generate a first color conversion matrix operator of the set of predetermined color conversion matrix operators based on the mapping in the first color space, to determine, for the input pixel, one or more operators to convert input pixel values associated with the input pixel to output pixel values, wherein the operators comprise at least the first color conversion matrix operator selected from the set of predetermined color conversion matrix operators and the first color conversion matrix operator is selected based at least in part on the perceptual color space value associated with the input pixel, and to apply the one or more operators to the input pixel values in the first color space to generate the output pixel values, wherein output image data in the first color space comprises the output pixel values.

12. The system of claim 11, wherein the first color space comprises a red green blue (RGB) color space and the perceptual color space value comprises a hue value of a hue chroma luma (HCL) color space.

13. The system of claim 11, wherein the set of predetermined color conversion matrix operators comprises color correction matrices each associated with a sector of a hue chroma plane of a hue chroma luma (HCL) color space.

14. The system of claim 11, wherein the one or more operators further comprise a chroma adaptation operator and a luma adaptation operator.

15. The system of claim 11, wherein the one or more operators further comprise a chroma adaptation operator to apply a chroma factor to intermediate pixel values associated with the input pixel values without affecting a luma or a hue of the intermediate pixel values, and wherein the processor is further to determine the chroma factor from a set of predetermined chroma factors based on a chroma value and a luma value associated with at least one of the input pixel values or the intermediate pixel values.

16. The system of claim 11, wherein the one or more operators further comprise a luma adaptation operator to apply a luma factor to intermediate pixel values associated with the input pixel values without affecting a chroma or a hue of the intermediate pixel values, and wherein the processor is further to determine the luma factor from a set of predetermined luma factors based on a chroma value and a luma value associated with at least one of the input pixel values or the intermediate pixel values.

17. The system of claim 11, wherein the first color space comprises a red green blue (RGB) color space and the perceptual color space value comprises a hue value of a hue chroma luma (HCL) color space, and wherein the one or more operators further comprise a chroma adaptation operator to apply a chroma factor to intermediate pixel values associated with the input pixel values without affecting a luma or a hue of the intermediate pixel values and a luma adaptation operator to apply a luma factor to the intermediate pixel values without affecting a chroma or the hue of the intermediate pixel values.

18. At least one non-transitory machine readable medium comprising a plurality of instructions that, in response to being executed on a device, cause the device to perform color conversion by:
generating a perceptual color space value associated with an input pixel of input image data in a first color space, wherein the first color space is divided into a plurality of slices, input calibration vectors are defined for a first slice of the plurality of slices in a perceptual color space, and output calibration vectors are provided for the first slice of the perceptual color space;
converting the input and output calibration vectors in the perceptual color space to a mapping in the first color space;
generating a first color conversion matrix operator of the set of predetermined color conversion matrix operators based on the mapping in the first color space;
determining, for the input pixel, one or more operators for converting input pixel values associated with the input pixel to output pixel values, wherein the operators comprise at least the first color conversion matrix operator selected from the set of predetermined color conversion matrix operators, wherein the first color conversion matrix operator is selected based at least in part on the perceptual color space value associated with the input pixel; and
applying the one or more operators to the input pixel values in the first color space to generate the output pixel values, wherein output image data in the first color space comprises the output pixel values.

19. The machine readable medium of claim 18, wherein the first color space comprises a red green blue (RGB) color space and the perceptual color space value comprises a hue value of a hue chroma luma (HCL) color space.

20. The machine readable medium of claim 18, wherein the set of predetermined color conversion matrix operators comprises color correction matrices each associated with a sector of a hue chroma plane of a hue chroma luma (HCL) color space, wherein the color correction matrices are continuous over segments in the first color space.

21. The machine readable medium of claim 18, wherein the one or more operators further comprise a chroma adaptation operator to apply a chroma factor to intermediate pixel values associated with the input pixel values without affecting a luma or a hue of intermediate pixel values, the machine readable medium comprising further instructions that, in response to being executed on the device, cause the device to perform color conversion by:

determining the chroma factor from a set of predetermined chroma factors based on a chroma value and a luma value associated with at least one of the input pixel values or the intermediate pixel values.

22. The machine readable medium of claim 18, wherein the one or more operators further comprise a luma adaptation operator to apply a luma factor to intermediate pixel values associated with the input pixel values without affecting a chroma or a hue of the intermediate pixel values, the machine readable medium comprising further instructions that, in response to being executed on the device, cause the device to perform color conversion by:

determining the luma factor from a set of predetermined luma factors based on a chroma value and a luma value associated with at least one of the input pixel values or the intermediate pixel values.

\* \* \* \* \*